US012653655B2

(12) United States Patent
Zhou et al.

(10) Patent No.: US 12,653,655 B2
(45) Date of Patent: Jun. 16, 2026

(54) ORAL IRRIGATOR TIP

(71) Applicant: Colgate-Palmolive Company, New York, NY (US)

(72) Inventors: Jiang Zhou, Nantong (CN); Tonny He, Yangzhou (CN)

(73) Assignee: Colgate-Palmolive Company, New York, NY (US)

( * ) Notice: Subject to any disclaimer, the term of this patent is extended or adjusted under 35 U.S.C. 154(b) by 132 days.

(21) Appl. No.: 18/690,153

(22) PCT Filed: Sep. 10, 2021

(86) PCT No.: PCT/CN2021/117553
§ 371 (c)(1),
(2) Date: Mar. 7, 2024

(87) PCT Pub. No.: WO2023/035204
PCT Pub. Date: Mar. 16, 2023

(65) Prior Publication Data
US 2024/0366350 A1     Nov. 7, 2024

(51) Int. Cl.
*A61C 17/02*          (2006.01)

(52) U.S. Cl.
CPC ................................ *A61C 17/0202* (2013.01)

(58) Field of Classification Search
CPC .......... A61C 17/0202; A61C 2204/007; A61C 1/087
See application file for complete search history.

(56) References Cited

U.S. PATENT DOCUMENTS

| 5,558,518 A | 9/1996 | Bab et al. |
| 9,566,130 B2 | 2/2017 | Mueller |
| (Continued) | | |

FOREIGN PATENT DOCUMENTS

| CN | 1698663 | * 11/2005 |
| DE | 8805494.2 | 11/1988 |
| (Continued) | | |

OTHER PUBLICATIONS

Amazon.com, Waterpik Whitening Water Flosser Refill Tablets—Only for Use with Waterpik Whitening Flosser-30 Count, https://www.amazon.com/Waterpik-Whitening-Flosser-Tablets-compatible/dp/B079NHM5HX, retrieved Jul. 21, 2021, 2021, pp. 1-10.
(Continued)

*Primary Examiner* — Amy R Weisberg

(57) ABSTRACT

An oral irrigator tip (120) for an oral irrigator (100). The oral irrigator tip (120) may be configured for coupling to an oral irrigator (100) for purposes of irrigating a users teeth, gums, and interproximal regions. The oral irrigator tip (120) contains a dispensing member (150) in its interior, and the dispensing member (150) leaches an oral care agent during use as a fluid such as water flows past the dispensing member (150) within the interior of the oral irrigator tip (120). The oral irrigator tip (120) may be a monolithic structure. The dispensing member (150) may be non-removable from the interior of the oral irrigator tip (120), such that upon depletion of the oral care agent from the dispensing member (150) the entire oral irrigator tip (120) is replaced. The dispensing member (150) may be in the shape of a torus such that the dispensing member (150) does not impede the flow of the fluid through the oral irrigator tip (120).

18 Claims, 7 Drawing Sheets

(56)     References Cited

U.S. PATENT DOCUMENTS

|  |  |  |  |  |
|---|---|---|---|---|
| 9,681,743 | B2 | 6/2017 | Xi et al. | |
| 9,724,178 | B2 * | 8/2017 | Roberts | A61C 19/063 |
| D800,896 | S | 10/2017 | Roberts et al. | |
| 10,959,931 | B2 | 3/2021 | Snyder | |
| 11,179,231 | B2 | 11/2021 | Taylor et al. | |
| 2007/0118035 | A1 * | 5/2007 | Secora | A61B 8/12 |
| | | | | 600/462 |
| 2010/0151406 | A1 | 6/2010 | Boutoussov et al. | |
| 2010/0248179 | A1 | 9/2010 | Sogaro | |
| 2014/0127641 | A1 | 5/2014 | Hilscher et al. | |
| 2014/0272769 | A1 | 9/2014 | Luettgen et al. | |
| 2015/0118645 | A1 | 4/2015 | Cohen Tanugi | |
| 2015/0250570 | A1 | 9/2015 | Persons et al. | |
| 2017/0020275 | A1 * | 1/2017 | Xi | A46D 1/0207 |
| 2018/0263742 | A1 | 9/2018 | Taylor et al. | |

FOREIGN PATENT DOCUMENTS

|  |  |  |  |  |  |
|---|---|---|---|---|---|
| EP | 0259219 | A2 * | 3/1988 | | A61K 9/2072 |
| WO | 2008/046580 | | 4/2008 | | |
| WO | 2023/035204 | | 3/2023 | | |

OTHER PUBLICATIONS

International Search Report and the Written Opinion of the International Searching Authority issued in International Application PCT/CN2021/117553 mailed May 25, 2022.

* cited by examiner

ORAL IRRIGATOR TIP

BACKGROUND

Water flossers, also known as oral irrigators, have increased in popularity recently due to their ease of use and effectiveness in removing plaque from interproximal areas of a user's mouth. Conventional water flossers inject water through a nozzle to clean the areas between the teeth, but do not also provide treatment to the interproximal areas and gum pockets to address periodontal disease and other oral maladies. Thus, a need exists for improvements to such water flossers and/or the tips thereof to address these deficiencies.

BRIEF SUMMARY

The present invention is directed to an oral irrigator tip for an oral irrigator. Specifically, the oral irrigator tip is intended to be coupled to an oral irrigator or oral irrigator handle for purposes of irrigating a user's teeth, gums, and interproximal regions. The oral irrigator tip contains a dispensing member in its interior, and the dispensing member leaches an oral care agent during use as a fluid such as water flows past the dispensing member within the interior of the oral irrigator tip. The oral irrigator tip may be a monolithic structure. The dispensing member may be non-removable from the interior of the oral irrigator tip, such that upon depletion of the oral care agent from the dispensing member the entire oral irrigator tip is replaced. The dispensing member may be in the shape of a torus such that the dispensing member does not impede the flow of the fluid through the oral irrigator tip.

In one aspect, the invention may be an oral irrigator tip comprising: an elongated tube comprising: an internal fluid passageway that extends from an inlet at a first end of the elongated tube to an outlet at a second end of the elongated tube; an attachment portion configured to couple the oral irrigator tip to an oral irrigator handle; and a bulbous portion located between the attachment portion and the second end, the bulbous portion defining a chamber that surrounds the internal fluid passageway; a dispensing member comprising an oral care agent disposed within the chamber of the bulbous portion of the elongated tube, wherein the oral care agent is configured to be released from the dispensing member as a fluid flows through the internal fluid passageway; and wherein the elongated tube is a monolithic structure.

In another aspect, the invention may be an oral irrigator tip comprising: an elongated tube comprising: an internal fluid passageway that extends from an inlet at a first end of the elongated tube to an outlet at a second end of the elongated tube; an attachment portion configured to couple the oral irrigator tip to an oral irrigator handle; and a bulbous portion located between the attachment portion and the second end, the bulbous portion defining a chamber that surrounds the internal fluid passageway; and a dispensing member comprising a rigid body that is non-removably disposed within the chamber of the bulbous portion of the elongated tube, the dispensing member comprising an oral care agent that is configured to be released from the rigid body as a fluid flows through the internal fluid passageway.

In yet another aspect, the invention may be an oral irrigator tip comprising: an elongated tube comprising: an internal fluid passageway that extends from an inlet at a first end of the elongated tube to an outlet at a second end of the elongated tube; an attachment portion configured to couple the oral irrigator tip to an oral irrigator handle; and a bulbous portion located between the attachment portion and the second end, the bulbous portion defining a chamber that surrounds the internal fluid passageway; and a dispensing member comprising an oral care agent and having a torus shape, the dispensing member being positioned within the chamber of the bulbous portion of the elongated tube so that a central opening of the dispensing member is aligned with the internal fluid passageway, wherein the oral care agent is configured to be released from the dispensing member as a fluid flows through the internal fluid passageway.

In a further aspect, the invention may be an oral irrigator tip comprising: an elongated tube comprising: an internal fluid passageway that extends from an inlet at a first end of the elongated tube to an outlet at a second end of the elongated tube; an attachment portion configured to couple the oral irrigator tip to an oral irrigator handle; and a bulbous portion located between the attachment portion and the second end, the bulbous portion defining a chamber that surrounds the internal fluid passageway; and a dispensing member comprising an oral care agent positioned within the chamber of the bulbous portion of the elongated tube, the dispensing member comprising a visual characteristic that is visible through the elongated tube, the visual characteristic of the dispensing member changing over a regimen of multiple uses of the oral irrigator tip as more of the oral care agent becomes released from the dispensing member to serve as an indicator to a user regarding depletion of the oral care agent.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
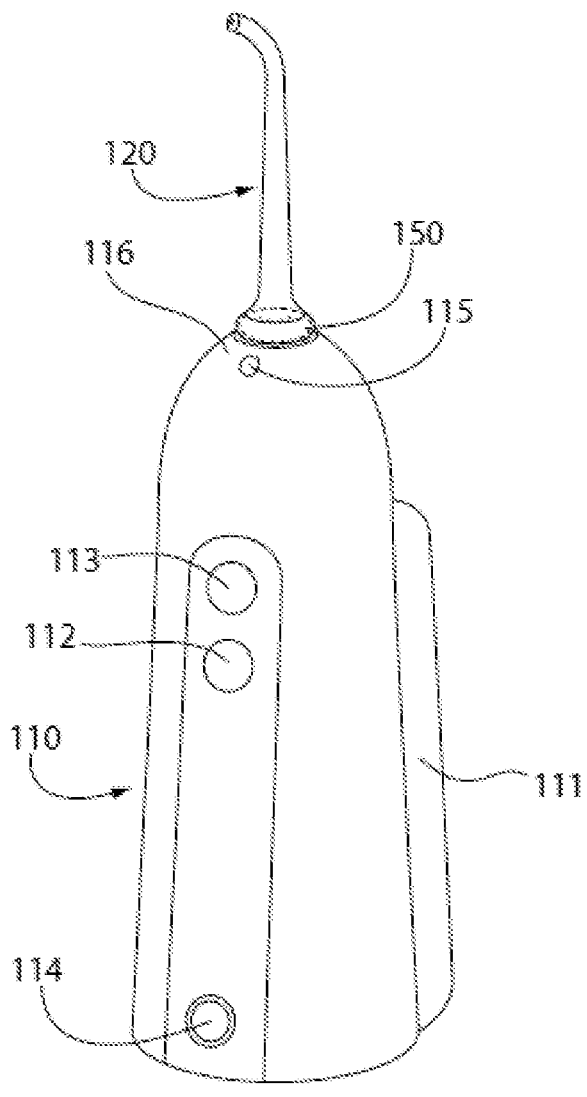
FIG. 1 is a perspective view of an oral irrigator comprising an oral irrigator tip in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring first to FIG. 1, an oral irrigator 100 is illustrated in accordance with an embodiment of the present invention. The oral irrigator 100 comprises an oral irrigator handle (hereinafter "handle") 110 and an oral irrigator tip (hereinafter "tip") 120. The handle 110 is the portion of the oral irrigator 100 that is gripped by a user during use. Furthermore, the handle 110 has an internal cavity (not shown) that houses the various electronic components necessary for proper operation of the oral irrigator 100. Thus, for example, the handle 110 may house a power source such as a battery, a motor, a pump, and any other electronic components that may be required for operation. In some embodiments, the handle 110 may also house a processor that controls operation of the motor and the pump in accordance with a mode selected by a user. The handle 110 may also include a reservoir or tank 111 that holds a supply of a fluid, such as water, that is intended to be injected or otherwise introduced into a user's oral cavity during use. In other embodiments, the handle 110 may be fluidly coupled directly to a showerhead or faucet in order to be supplied with the fluid that is to be introduced into the user's oral cavity during use.

In the exemplified embodiment, the handle 110 comprises a power button 112, a mode button 113, a charging interface 114, and an unlock button 115. The power button 112 controls the on/off actuation and deactivation of the oral irrigator 100. Specifically, pressing the power button 112 either initiates activation of the motor and/or pump or initiates deactivation of the motor and/or pump. The mode button 113 enables a user to select a desired mode, such as normal mode, massage mode, high power mode, and the like. For example, upon powering on the device, the user may actuate the mode button 113 until the desired mode has been selected, and then may actuate the power button 112 again to activate the device. Of course, the user may select the mode before powering on the device in other embodiments. The charging interface 114 enables the oral irrigator 100 to be coupled to a power adaptor so that the power source of the oral irrigator 100 can be charged. The unlock button 115 may be depressed when it is desired for a user to remove the tip 120 from the handle 110. Specifically, a user may actuate the unlock button 115, which then allows the user to separate the tip 120 from the handle 110 when it is needed for replacement, cleaning, or any other purpose.

Briefly, operation of the oral irrigator 100 will be described. First, a user fills the reservoir 111 with a fluid, such as water. Next, the user may press the power button 112 to wake up the device. Next, the user may press the mode button 113 until the desired mode has been selected. The modes may be displayed on a display on a front face of the handle 111 in some embodiments. Such a display may be a screen-type display, or it may comprise a plurality of illumination elements positioned adjacent to text or other indicia indicative of the various modes. Once the desired mode has been selected, the user may press the power button 112 again, which will activate the motor and/or pump. Thus, when the user presses the power button 112 after selection of the mode, the distal end of the tip 120 which contains an outlet should be located within the user's mouth. At this point, the fluid from the reservoir 111 will flow through the tip 120 and out of the outlet of the tip 120 into the user's oral cavity. The user can move the outlet of the tip 120 along the teeth, interproximal regions, gum line, and the like to perform cleaning of those regions of the oral cavity. The oral irrigator 100 may power down automatically after a predetermined period of time, or a user may be required to press the power button 112 to power down the device after the user has completed their cleaning regimen.

In the exemplified embodiment, the tip 120 comprises a dispensing member 150 that comprises an oral care agent. The oral care agent is configured to be released from the dispensing member 150 during use of the oral irrigator 100. Specifically, as the fluid flows through the tip 120, the fluid causes the oral care agent to be released from the dispensing member 150. In some embodiments, this may be the result of the oral care agent dissolving as it is contacted by the fluid flowing through the tip 120. The oral care agent then flows with the fluid into the user's oral cavity to impart some benefit to the oral cavity (e.g., breath freshening benefit, bacteria removal benefit, gum care benefit, or the like).

As seen in FIG. 1, the handle 110 of the oral irrigator 100 has a top end 116, and the tip 120 is connected to the handle 110 at the top end 116 so that the tip 120 protrudes upwardly from the top end 116 of the handle 110. The handle 110 has an opening in the top end 116 through which the tip 120 can be inserted for purposes of coupling the tip 120 to the handle 110. When the tip 120 is connected to the handle 110, the dispensing member 150 is located immediately above the top end 116 of the handle 110. Furthermore, the tip 120 may be transparent. Thus, the dispensing member 150 is entirely visible when the tip 120 is connected to the handle 110 because the dispensing member 150 is not located within the opaque housing of the handle 110. By having the dispensing member 150 positioned immediately outside of the top end 116 of the handle 110, it draws a user's attention which may be valuable when the dispensing member 150 has an inherent indicator characteristic, which will be described in greater detail below.

Figure 2:
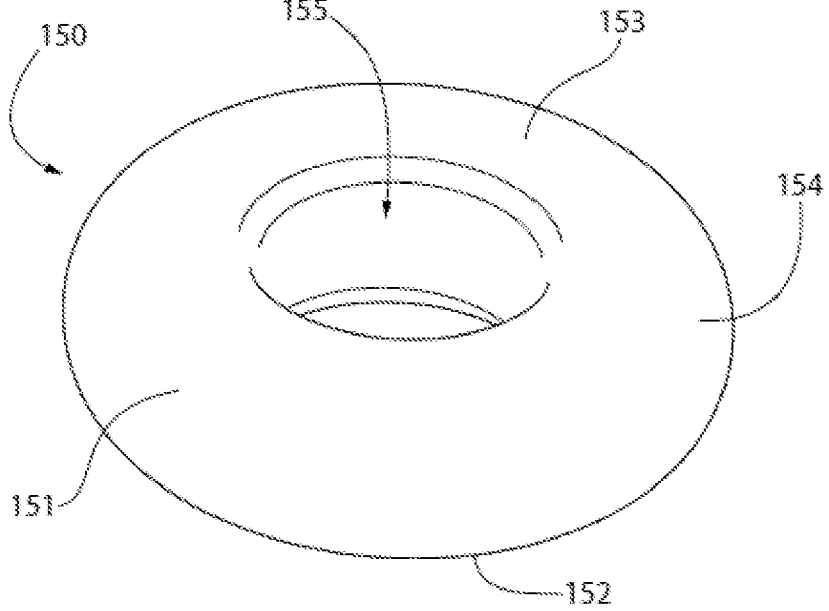
FIG. 2 is a perspective view of a dispensing member of the oral irrigator of FIG. 1

Referring to FIG. 2, the dispensing member 150 will be described in accordance with an embodiment of the present invention. The dispensing member 150 may be a tablet in the exemplified embodiment, which is a compressed solid substance with a measured amount of a benefit agent. In one such embodiment, the tablet may be formed entirely from the oral care agent, such that the tablet may dissolve over the course of numerous uses of the oral irrigator 100. In other embodiments, the tablet may be formed from a non-dissolvable material that is coated, partially coated, covered, or partially covered, with the oral care agent. The non-dissolvable material may form a rigid body that is non-removably disposed within the chamber. In such an embodiment, the oral care agent may dissolve or be otherwise released from the tablet, while the non-dissolvable material remains. This may impart benefits such as enabling the dispensing member 150 to operate as an indicator, as discussed in greater detail below with reference to FIGS. 7A-7C. Furthermore, by only dissolving the agent and not the structure of the tablet itself, this prevents small particles from being broken off from the tablet and then getting stuck in the tip 120 or the pump or even be injected into the mouth and swallowed which could lead to discomfort. Thus, in some preferable embodiments, the structure of the dispensing member (or tablet) 150 remains while the oral care agent is simply released or otherwise dispensed therefrom.

In still other embodiments, the dispensing member 150 may be a tablet or the like, whereby the oral care agent is dispersed throughout rather than just being a coating thereon. In still other embodiments, the dispensing member 150 may be a housing containing the oral care agent, such that as the fluid passing through the tip 120 enters the housing the oral care agent may slowly dissolve into the fluid to be introduced into the user's oral cavity. Thus, many variations are possible with regard to the specific details of the dispensing member 150. However, the dispensing member 150 should be a structure that is disposed within the interior of the tip 120 so that the oral care agent is released (either by dissolving or through other techniques) as the fluid passes through the interior of the tip 120.

The oral care agent of the dispensing member 150 may be any oral care agent designed to impart benefits to a user when introduced into the user's mouth. For example, the oral care agent may be a breath freshening agent, a bacterial removal agent, a gum treatment agent, an anti-sensitivity agent, or the like in various different embodiments. Preferably, the oral care fluid comprises one or more oral care agents. Any suitable oral care agent(s) can be used. Thus, the oral care agent may be a mouthwash-type agent comprising one or more antibacterial agents, flavors or flavor ingredients, and breath freshening ingredients. In other embodiments, the oral care agent may comprise one or more oral care agents selected from the group consisting of: antibacterial agents; anti-inflammatory agents, anti-attachment agents, plaque indicator agents, flavorants, sensates, colorants, oxidative or whitening agents; enamel strengthening or repair agents; tooth erosion preventing agents; tooth anti-sensitivity ingredients; gum health actives; nutritional ingredients; tartar control or anti-stain ingredients; enzymes; sensate ingredients; caries or plaque disclosing agents; flavors or flavor ingredients; breath freshening ingredients; oral malodor reducing agents; anti-attachment agents or sealants; diagnostic solutions; occluding agents, dry mouth relief ingredients; catalysts to enhance the activity of any of these agents; colorants or aesthetic ingredients; and combinations thereof. In some embodiments, the oral care agent may comprise more than one of the oral care agents listed above. The oral care agent may be free of toothpaste in some embodiments. The oral care agent may be intended to provide supplemental oral care benefits in addition to merely brushing one's teeth.

In some embodiments, the dispensing member 150 may comprise a non-dissolvable portion as noted above, such that the non-dissolvable portion always remains in the elongated tube 121 even after the oral care agent has been completely depleted. In other embodiments, the entire dispensing member 150 may dissolve over multiple uses. Thus, the dispensing member 150 may be a partially or completely dissolvable member. The dispensing member may contain any desired treatment agent for aiding in cleaning the mouth and preventing periodontal diseases. For example, the dispensing member may comprise mouthwash or other treatments, such as fluoride, that may aid in the prevention of gum or dental diseases and may combat bad breath. In some embodiments, the dispensing member may comprise flavorants to encourage people, such as children, to use the oral irrigator 100. For example, the dispensing members may be mint, bubble gum, or fruit flavored, or other desirable flavors.

Figure 5:
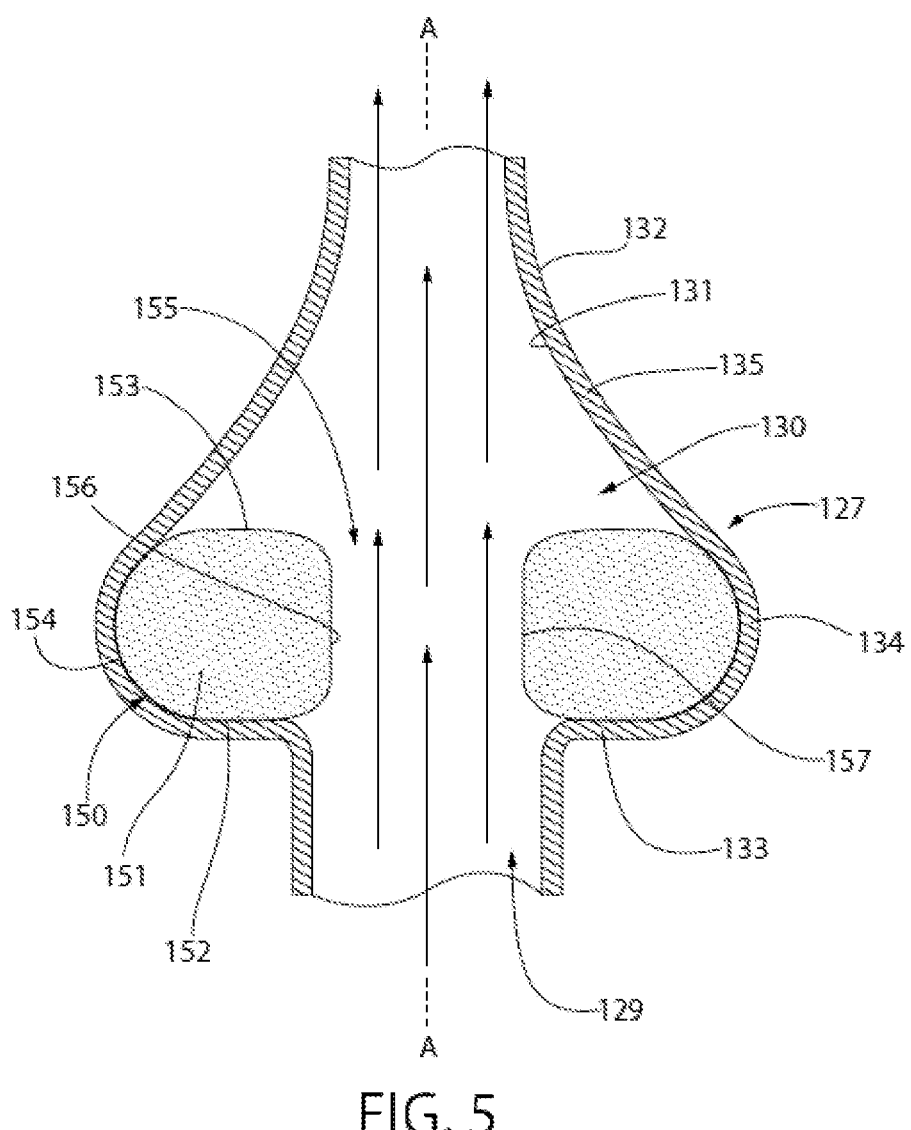
FIG. 5 is a cross-sectional view taken along line V-V of FIG. 4.

Referring to FIGS. 2 and 5 concurrently, in the exemplified embodiment the dispensing member 150 is in the shape of a torus or doughnut. That is, the dispensing member 150 comprises an annular body 151 having a lower surface 152, an upper surface 153, a peripheral surface 154 extending between the upper and lower surfaces 152, 153, and a central opening 155 that extends through the full thickness of the dispensing member 150 from the upper surface 153 to the lower surface 152. The dispensing member 150 has an inner surface 156 that surrounds the central opening 155. The central opening 155 provides a passageway for the fluid to flow through the dispensing member 150 during use of the oral irrigator 150 so that the dispensing member 150 does not impede the flow of the fluid and slow its velocity. The velocity of the fluid can be important to ensure that it contacts the teeth, gums, and interproximal spaces with sufficient velocity and force to dislodge stuck particles, plaque, tartar, and the like. Thus, by forming the dispensing member 150 with the central opening 155, there is space for the fluid to flow without its velocity being reduced while still ensuring that the fluid comes into contact with the dispensing member 150 to facilitate the dispensing or release of the oral care agent.

Figures 3, 4:
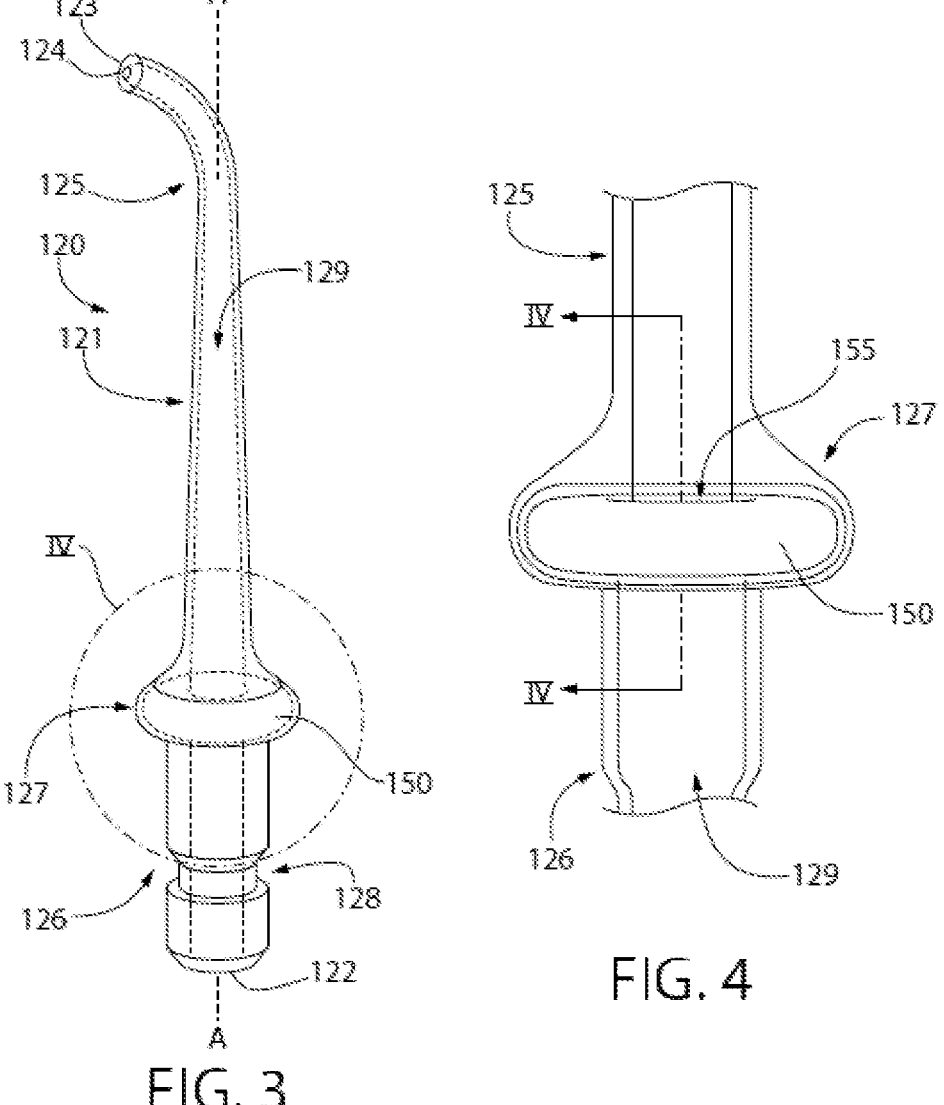
FIG. 3 is a perspective view of the oral irrigator of FIG. 1.
FIG. 4 is a close-up front view of area IV of FIG. 3.

Referring to FIGS. 3 and 4, the tip 120 will be further described. In FIG. 3, the full tip 120 is shown by itself without the handle 110, and in FIG. 4 a close-up of a portion of the tip 120 is illustrated. The tip 120 is configured to control the flow of the fluid from the reservoir 111 to the user's oral cavity. The tip 120 comprises an elongated tube 121 that extends along a longitudinal axis A-A and the dispensing member 150 that is disposed within the interior of the elongated tube 121. The elongated tube 121 may be formed from a rigid material, such as a hard plastic. In other embodiments the elongated tube 121 may be formed from a resilient and flexible material, such as a rubber or the like. In some embodiments, the elongated tube 121 may be transparent. In other embodiments, the elongated tube 121 may be translucent, while still enabling the dispensing member 150 to be visible through the elongated tube 121 as described herein. In some embodiments, at least the portion of the elongated tube 121 that houses the dispensing member 150 is transparent.

The elongated tube 121 comprises a first end 122 having an inlet through which the fluid exits the handle 110 and enters the elongated tube 121 and a second end 123 having an outlet 124 through which the fluid exits the tip 120 and is injected into the user's oral cavity. The elongated tube 121 comprises an internal fluid passageway 129 that extends from the inlet at the first end 122 to the outlet 124 at the second end 123. Thus, fluid that enters the inlet flows through the internal fluid passageway 129 and exits at the outlet 124. During use, the user aligns the outlet 124 with the gums or interproximal spaces or other regions of the oral cavity, and the fluid is injected through the outlet 124 onto the desired regions of the oral cavity.

The elongated tube 121 comprises a main portion 125, an attachment portion 126, and a bulbous portion 127 located between the main portion 125 and the attachment portion 126. The attachment portion 126 comprises the first end 122 and the main portion 125 comprises the second end 123. The main portion 125 has a curvature in the exemplified embodiment, to help a user target specific areas of the oral cavity while holding the handle 110. That is, the main portion 125 comprises a proximal portion that is adjacent to the bulbous portion 127 and which extends axially in the direction of the longitudinal axis A-A and a distal portion that is curved or bent relative to the proximal portion to direct the fluid into the user's oral cavity. In other embodiments, the main portion 125 may be straight or may have an even greater curvature (including curving back downwardly towards the attachment portion 126 to allow for easier injection of fluids onto the lingual surfaces of the user's teeth) in various different embodiments.

The attachment portion 126 is configured to attach the tip 120 of the oral irrigator 100 to the handle 110 of the oral irrigator 100. The attachment portion 126 may comprise a locking feature 128 that cooperates with a locking feature of the handle 110 to lock the tip 120 to the handle 110. In the exemplified embodiment, the locking feature 128 of the attachment portion 126 of the tip 120 is an annular notch. In such an embodiment, the locking feature of the handle 110 may comprise a protuberance that mates with the notch when the tip 120 is inserted into the handle 110 to lock the tip 120 to the handle 110. As noted above, a user can press the unlock button 115 on the handle 110 to disengage the locking feature of the handle 110 from the locking feature 128 of the attachment portion 126 of the tip 120 when it is desired to detach the tip 120 from the handle 110. It should be appreciated that the structure of the locking feature 128 of the attachment portion 126 of the tip 120 may be different than that shown in FIG. 3 in alternative embodiments. For example, the locking feature 128 may be a notch that is not annular, or the locking feature 128 may be a protuberance that engages a notch within the handle 110, or the like. In still other embodiments, the tip 120 may attach to the handle 110 using a friction fit, such that there is no locking feature. As shown in FIG. 1, when the tip 120 is coupled to the handle 110, the attachment portion 126 of the tip 120 nests in an interior of the housing of the handle 110 and is therefore not visible. The lowermost part of the tip 120 that is visible when the tip 120 is coupled to the handle 110 is the bulbous portion 127 and the dispensing member 150 therein.

Referring to FIGS. 3-5 concurrently, the bulbous portion 127 of the elongated tube 121 of the tip 120 will be described. The bulbous portion 127 of the tip 120 houses the dispensing member 150. The bulbous portion 127 defines a chamber 130, and the dispensing member 150 is disposed within the chamber 130. That is, the dispensing member 150 is positioned within the interior of the bulbous portion 127 of the elongated tube 121. In the exemplified embodiment, the chamber 130 is an annular chamber that circumferentially surrounds the internal fluid passageway 129. As best seen in FIG. 5, the dispensing member 150 is positioned within the chamber 130 so that the central opening 155 of the dispensing member 150 is aligned with the internal fluid passageway 129. This allows the fluid flowing within the internal fluid passageway 129 to flow through the central aperture 155 of the dispensing member 150 without being impeded and without causing a reduction in the velocity of the fluid through the internal fluid passageway 129. However, the fluid may still contact the dispensing member 150 and cause the oral care agent to be released therefrom.

The bulbous portion 127 and the dispensing member 150 are specifically sized and shaped so that the dispensing member 150 is fixedly held within chamber 130. That is, the dispensing member 150 is unable to be removed from the chamber 130 of the bulbous portion 127 of the elongated tube 121 due to a fit interaction between the bulbous portion 127 of the elongated tube 121 and the dispensing member 150. In particular, the elongated tube 121 comprises an inner surface 131 that defines the internal fluid passageway 129 and an outer surface 132 opposite the inner surface 131. The inner surface 131 contacts portions of the outer surface of the dispensing member 150 to hold it in place within the chamber 130. The bulbous portion 127 comprises an annular ledge portion 133 upon which the lower surface 152 of the dispensing member 150 is positioned, a convex position 134 that wraps around at least a portion of the outer peripheral surface 154 of the dispensing member 150, and a concave portion 135 that converges inwardly towards the longitudinal axis A-A with distance away from the attachment portion 127 and towards the second end 123 of the elongated tube 121. In the exemplified embodiment, the annular ledge portion 133 is oriented perpendicular relative to the longitudinal axis A-A.

In the exemplified embodiment, the bulbous portion 127 is a rounded bulge of the elongated tube 121 relative to a remainder of the elongated tube 121. That is, the bulbous portion 127 is a radially expanded portion of the elongated tube 121 that is has a larger cross-sectional area than the remainder of the elongated tube 121 in order to form the chamber 130 which can house the dispensing member 130. However, the bulbous portion 127 is not limited to being round in all embodiments, and the term bulbous as used herein is intended to mean any radially expanded shape as compared to the rest of the elongated tube 121. Thus, in other embodiments the bulbous portion 127 square or triangular or other polygonal shapes, or may be partially but not fully rounded. Basically, the bulbous portion 127 is a region of the elongated tube 121 with an increased cross-sectional area as compared to the remainder of the elongated tube 121 to form a region or chamber within which a tablet or other dispensing member may be disposed. Furthermore, in some embodiments the bulbous portion 127 of the elongated tube 121 may be shaped so as to wrap over the top surface 153 of the dispensing member 150. Specifically, instead of the convex portion 135, the bulbous portion 127 may have a roof opposite the ledge portion 133 that at least partially extends over the upper surface 153 of the dispensing member 150 to hold the dispensing member 150 in place within the chamber 130. Thus, the exact shape of the bulbous portion 127 is not to be limiting of the present invention unless specifically claimed to have a particular shape.

With the combination of the ledge portion 133, the convex portion 134, and the concave portion 135, the sidewall of the elongated tube 121 sufficiently wraps around the dispensing member 150 to retain it in place within the chamber 130. The dispensing member 150 is therefore unable to move axially, transversely, or rotationally about an axis transverse to the axial direction of the central opening 155 when positioned within the chamber 130. Rather, the dispensing member 150 is fixed in place. The dispensing member 150 may have an outer diameter that is approximately equal to the maximum inner diameter of the elongated tube 121 along the bulbous portion 127 to further facilitate holding the dispensing member 150 fixed in place within the bulbous portion 127.

The term approximately equal as used in this context may include embodiments whereby the inner diameter of the elongated tube 121 is up to 5% greater than the outer diameter of the dispensing member 150.

In the exemplified embodiment, the elongated tube 121 of the tip 120 is a monolithic structure. State another way, the elongated tube 121 is a unitary, integral, single-piece structure. The elongated tube 121 is specifically not formed from multiple parts that are detachably coupled together. The elongated tube 121 may be formed around the dispensing member 150 in order to trap the dispensing member 150 within the chamber 130 of the bulbous portion 127. Thus, there is no way for a user to access the dispensing member 150 without breaking the elongated tube 121. The dispensing member 150 is therefore unable to be removed from the chamber 130 and a user is unable to replace the dispensing member 150 with another dispensing member 150 when the oral care agent of the dispensing member 150 is depleted. Rather, the user must replace the entire tip 120 upon the oral care agent being depleted if the user desires to obtain the benefits of the oral care agent. The tip 120 has a useful life or lifespan, just like a toothbrush, and should be replaced regularly. Thus, the depletion of the oral care agent may serve as a reminder to the user of the need to replace the tip 120 with a new tip. In some embodiments, the dispensing member 150 may be configured so that the oral care agent is depleted after three months of normal use or the tip 120. In other embodiments, the dispensing member 150 may be configured so that the oral care agent is depleted after six months of normal use of the tip 120.

As seen in FIG. 5 and described above, the central opening 155 of the dispensing member 150 is aligned with the internal fluid passageway 129 of the elongated tube 121. Furthermore, in the exemplified embodiment the dispensing member 150 sticks out past the edge of the ledge portion 133 of the bulbous portion 127. That is, the dispensing member 150 overhangs a portion of the inner surface 131 of the elongated tube 121 located between the bulbous portion 127 and the first end 122. As a result, an inner annular portion 157 of the dispensing member 150 extends into the internal fluid passageway 129. In such embodiment, some of the fluid flowing through the internal fluid passageway 129 may contact the inner annular portion 157 of the dispensing member 150 as the fluid flows towards the outlet 124. However, this is not required in all embodiments and the dispensing member 150 may not overhang the inner surface 131 of the attachment portion 126 of the elongated tube 121 in other embodiments.

Figure 6:
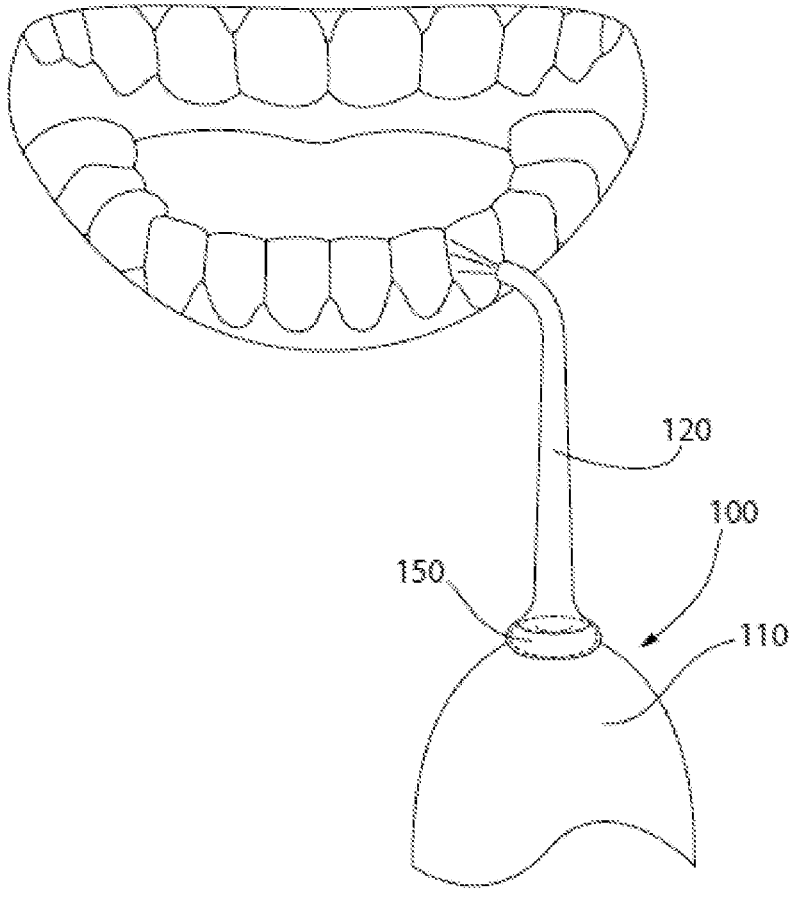
FIG. 6 is a perspective view illustrating the oral irrigator of FIG. 1 being used to spray a liquid into a user's interproximal regions.

FIG. 6 illustrates a user using the oral irrigator 100 to clean the interproximal areas of the oral cavity. That is, the outlet 124 of the elongated tube 121 is aligned with the spaces between the teeth, and the fluid (e.g., water or mouthwash or the like) is injected out of the outlet 124 and into the spaces between the teeth and along the gum line. The user moves the outlet 124 along the teeth and gums to perform a full cleaning regimen. As the fluid passes through the tip 120, the fluid contacts the dispensing member 150 thereby causing the oral care agent to be released from the dispensing member 150 and into the fluid which is injected into the oral cavity. As a result, the user receives the benefits of the oral care agent for therapeutic, anti-bacterial, fresh breath, or other desirable purposes.

Figures 7A, 7B, 7C:
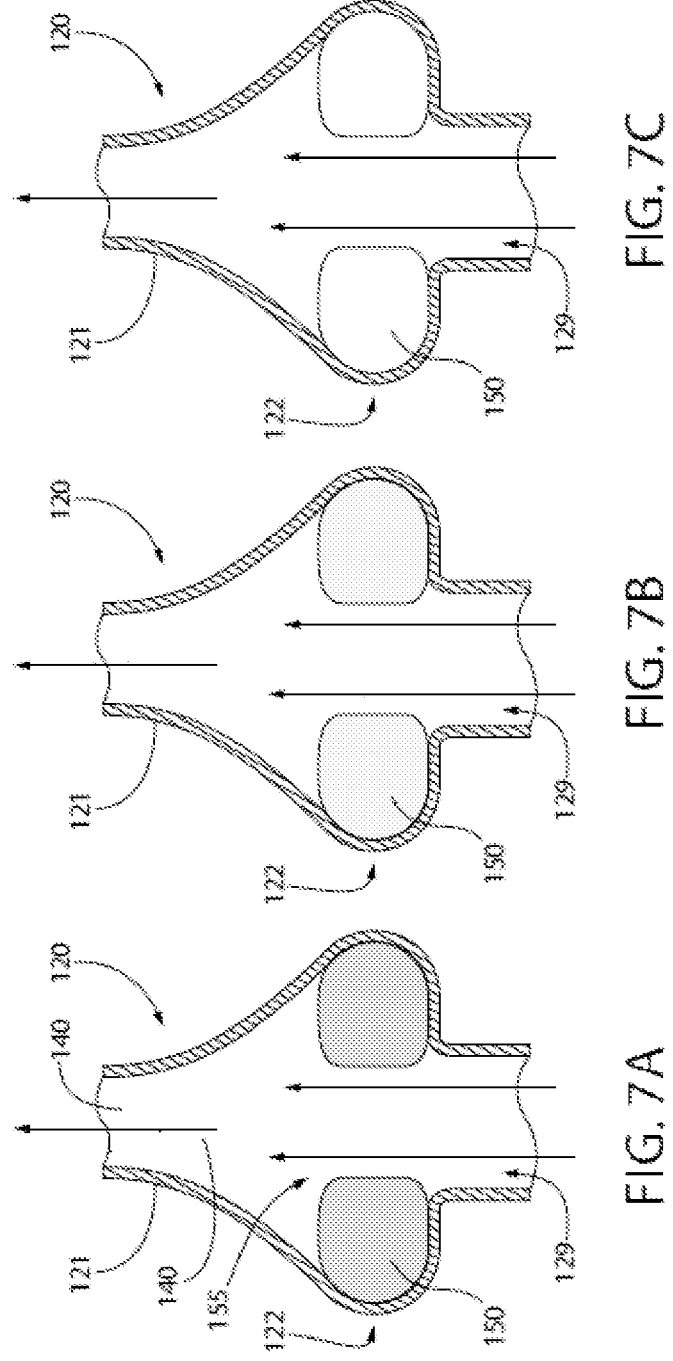
FIGS. 7A through 7C are cross-sectional views identical to FIG. 4 depicting an oral care agent of the dispensing member dissolving during use of the oral irrigator.

Referring to FIGS. 7A-7C, in one embodiment the dispensing member 150 may comprise a visible characteristic that changes as the oral care agent is released from the dispensing member 150 over a regimen of many uses. This change in the visible characteristic of the dispensing member 150 operates as a visual indicator to a user regarding depletion of the oral care agent from the dispensing member 150. This feature can also be used by a user to easily determine when the oral care agent has been completely depleted, such that the oral irrigator tip 120 should be replaced with a new oral irrigator tip.

FIG. 7A illustrates the dispensing member 150 having a first color. In FIG. 7A, the dispensing member 150 is shown as a dark grayscale color. However, the grayscale is indicative of any color and is not limited to any particular color. Thus, the dispensing member 150 could be red, blue, black, green, purple, or any color. The color of the dispensing member 150 may be indicator of the particular oral care agent. For example, the dispensing member 150 may be green to indicate that the oral care agent has a mint flavor. As seen in FIG. 7A, the fluid flows through the internal passageway 129 of the elongated tube 121 as shown by the arrows. Furthermore, the oral care agent being released or otherwise dispensed from the dispensing member 150 are illustrated as dots 140 in the internal passageway 129 In the exemplified embodiment, as the fluid flows through the internal fluid passageway 129, the fluid will contact the dispensing member 150 and cause the oral care agent to be released or dispensed therefrom. Although the central opening 155 of the dispensing member 150 is aligned with the internal fluid passageway 129, the fluid will still contact parts of the dispensing member 150 to facilitate the release of the oral care agent therefrom. Thus, in the exemplified embodiment the oral care agent is passively dispensed or released from the dispensing member 150 during use or the oral irrigator 100.

In other embodiments, the dispensing member 150 may release the oral care agent in other ways, such as on a timed schedule during operation of the oral irrigator 100. For example, the dispensing member 150 may be a housing with a reservoir and a pump or valve, and the dispensing member 150 may actively dispense the oral care agent therefrom during operation. The dispensing member 150 may include its own processor for timed dispensing, or it may be operably coupled to a processor of the oral irrigator 100 to facilitate such timed dispensing, in such embodiments.

Referring to FIG. 7B, after continued use of the tip 120 and as more of the oral care agent is dispensed or released from the dispensing member 150, the visual characteristic of the dispensing member 150 changes. For example, as more of the oral care agent is released from the dispensing member 150 the color of the dispensing member 150 that is visible to the user through the elongated tube 121 may change. In one embodiment, the color of the dispensing member 150 may fade as more of the oral care agent is released. Thus, the oral care agent may comprise the color, so that as more of the oral care agent is released the remaining part of the dispensing member 150 which is colorless is exposed to view. In other embodiments, the dispensing member 150 may comprise a non-dissolvable portion and the oral care agent as described above. In such an embodiment, the non-dissolvable portion may comprise a first color and the oral care agent may comprise a second color. Prior to use of the tip 120, the oral care agent may cover the non-dissolvable portion of the dispensing member 150 such that the second color of the oral care agent is visible. Over time and as the tip 120 is continued to be used (over multiple uses), the oral care agent is dispensed or released and the color of the dispensing member 150 may start to change from the second color to the first color as more of the non-dissolvable portion of the dispensing member 150 becomes exposed. This change in color from the second color to the first color serves as a visual indicator to a user regarding how much of the oral care agent remains.

In some embodiments, the dispensing member 150 may comprise a pre-determined amount of the oral care agent that corresponds to the lifecycle of the tip 120. That is, the tip 120 may be designed for daily use over the course of three months or six months before the tip 120 should be replaced. In such embodiments, the dispensing member 150 may comprise a sufficient amount of the oral care agent such that it becomes completely depleted after three or six months of daily use. A user will be alerted to this based on the change in the visible characteristics of the dispensing member as described herein and shown in FIGS. 7A-7C.

As seen in FIG. 7C, this illustrates the situation after the oral care agent has been completely released/dissolved. Thus, the dispensing member 150 is white (no grayscale, indicating a different color than when the oral care agent remained). Furthermore, there are no dots in the internal fluid passageway 129, which indicates that the oral care agent is no longer being released into the fluid as the fluid flows through the internal fluid passageway 129 because the oral care agent has been depleted. At this point, a user will be alerted to the fact that the oral care agent has been depleted (based on the visual characteristics, such as color, of the dispensing member 150). The user would then understand that the tip 120 should be replaced because it is time for a replacement and because the oral care agent is depleted. The user may be able to continue using the tip 120 for a time, with the understanding that it will no longer be releasing the oral care agent. However, even if the user no longer needs or wants the oral care agent, the user may want to replace the tip 120 because its preferred use lifecycle has expired.

Figure 8:
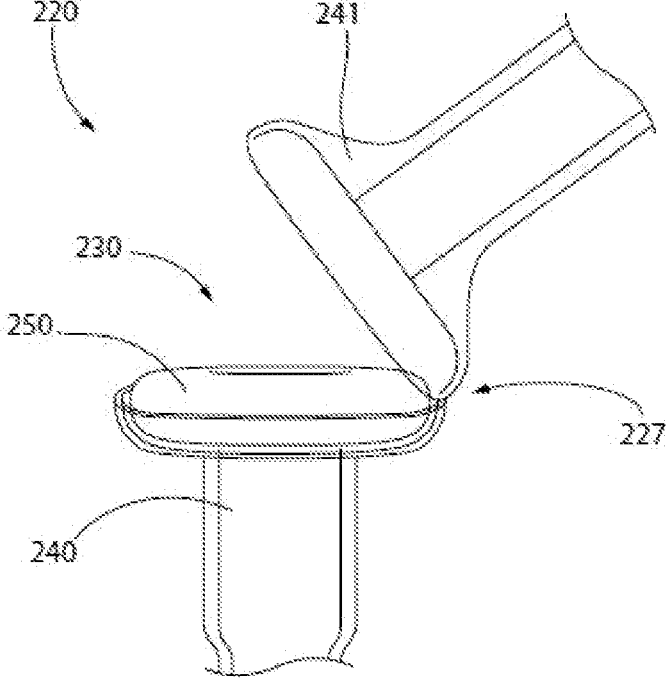
FIG. 8 is the close-up front view of area IV of FIG. 3 in accordance with an alternative embodiment.

Referring to FIG. 8, an alternative embodiment of an oral irrigator tip 220 will be described. FIG. 8 illustrates only a portion of the oral irrigator tip 220, and particularly a bulbous portion 227 thereof. The remainder of the oral irrigator tip 220 is identical to the oral irrigator tip 120 and thus will be not described herein in detail. The description of the oral irrigator tip 120 is completely applicable to the oral irrigator tip 220, except for the differences specifically noted herein.

The bulbous portion 227 of the oral irrigator tip 220 defines a chamber 230 for holding a dispensing member 250. The dispensing member 250 is identical to the dispensing member 150 previously described, and thus all details of the dispensing member 150 are applicable to the dispensing member 250 including details as to shape, materials, function, and the like. Thus, for example, the dispensing member 250 may be a doughnut or torus shape with a central opening so that the dispensing member 250 does not block the flow of the fluid through the fluid passageway.

The main difference between the oral irrigator tip 220 and the oral irrigator tip 120 is that the oral irrigator tip 220 is formed from two parts that are coupled together. That is, the oral irrigator tip 120 comprises a first part 240 and a second part 241 that are detachably coupled together. The first part 240 comprises a first portion of the bulbous portion 227 and the second part 241 comprises a second portion of the bulbous portion 227. Thus, the first and second parts 240, 241 collectively define the chamber 230 when the first and second parts 240, 241 are coupled together. The first and second parts 240, 241 may be coupled together via friction fit, interlocking features such as tabs and notches, threaded engagement, or the like. The attachment between the first and second parts 240, 241 should be sufficient to ensure that the first and second parts 240, 241 do not become detached during normal use of the oral irrigator tip 220, but rather requires direct and intentional user action.

Because the first and second parts 240, 241 are detachable, in this embodiment a user can detach the first and second parts 240, 241 to gain access to the chamber 230 for purposes of replacing the dispensing member 250 once it is depleted of its contents. Thus, once the visual characteristic (i.e., color or the like as discussed above) of the dispensing member 250 has changed, a user will know that the oral care agent is depleted. Instead of replacing the entire oral irrigator tip as with the previously described embodiment, a user may simply detach the first and second parts 240, 241, remove the dispensing member 250 with the depleted oral care agent from the chamber 230, and insert a new dispensing member 250 into the chamber 230. A user can also replace the dispensing member 250 with a new dispensing member even if it is not depleted, if the user wants to simply change the flavor or benefit being received by the dispensing member 250. That is, a user could change a dispensing member that dispenses a mint flavor with one that dispenses an oral care agent having an antibacterial feature, as desired, without having to change the entire oral irrigator tip 220.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral irrigator tip comprising:
an elongated tube comprising:
an internal fluid passageway that extends from an inlet at a first end of the elongated tube to an outlet at a second end of the elongated tube;
an attachment portion configured to couple the oral irrigator tip to an oral irrigator handle; and
a bulbous portion located between the attachment portion and the second end, the bulbous portion defining a chamber that surrounds the internal fluid passageway;
a dispensing member comprising an oral care agent disposed within the chamber of the bulbous portion of the elongated tube, wherein the oral care agent is configured to be released from the dispensing member as a fluid flows through the internal fluid passageway; and
wherein the elongated tube is a monolithic structure.

2. The oral irrigator tip according to claim 1 wherein the elongated tube comprises an inner surface that defines the internal fluid passageway and an outer surface opposite the inner surface, wherein the dispensing member comprises a lower surface, an upper surface, and a peripheral surface extending between the upper and lower surfaces, and wherein along the bulbous portion of the elongated tube, the inner surface of the elongated tube is in intimate surface contact with the lower and peripheral surfaces of the dispensing member to hold the dispensing member in a fixed position within the chamber.

3. The oral irrigator tip according to claim 1 wherein the elongated tube comprises an inner surface that defines the internal fluid passageway and an outer surface opposite the inner surface, and wherein the outer surface of the elongated tube is concave along an upper section of the bulbous portion located between the dispensing member and a main portion of the elongated tube.

4. The oral irrigator tip according to claim 1 wherein the bulbous portion of the elongated tube comprises an annular ledge upon which the dispensing member rests, the annular ledge extending radially outward from the internal fluid passageway.

5. The oral irrigator tip according to claim 1 wherein the dispensing member and the bulbous portion of the elongated tube are sized and shaped so that the dispensing member is non-removable from the chamber.

6. The oral irrigator tip according to claim 1 wherein the dispensing member is held and maintained at a fixed position within the chamber of the elongated tube by an interaction between an outer surface of the dispensing member and an inner surface of the elongated tube.

7. The oral irrigator tip according to claim 1 wherein the chamber is an annular chamber that circumferentially surrounds the internal fluid passageway, wherein the dispensing member is a tablet in a shape of a torus comprising a central opening, and wherein the dispensing member is positioned within the chamber of the bulbous portion of the elongated tube such that the opening of the dispensing member is aligned with the internal fluid passageway.

8. The oral irrigator tip according to claim 7 wherein the dispensing member overhangs a portion of an inner surface of the elongated tube located between the bulbous portion and the first end of the elongated tube such that an inner annular portion of the dispensing member extends into the internal fluid passageway.

9. The oral irrigator tip according to claim 1 wherein a visible characteristic of the dispensing member changes as the oral care agent is released from the dispensing member over many uses to provide a visual indication to a user that the oral irrigator tip should be replaced.

10. The oral irrigator tip according to claim 9 wherein the visible characteristic of the dispensing member is a color of the dispensing member that fades as the oral care agent is released from the dispensing member.

11. The oral irrigator tip according to claim 9 wherein the dispensing member comprises a non-dissolvable portion having a first visible characteristic and the oral care agent having a second visible characteristic, the oral care agent at least partially covering the non-dissolvable portion so that prior to first use the second visible characteristic is visible through the elongated tube, and wherein as the oral care agent is released from the dispensing member, the non-dissolvable portion of the dispensing member becomes exposed so that the first visible characteristic becomes visible through the elongated tube.

12. An oral irrigator tip comprising:

an elongated tube comprising:

an internal fluid passageway that extends from an inlet at a first end of the elongated tube to an outlet at a second end of the elongated tube;

an attachment portion configured to couple the oral irrigator tip to an oral irrigator handle; and a bulbous portion located between the attachment portion and the second end, the bulbous portion defining a chamber that surrounds the internal fluid passageway; and a dispensing member comprising a rigid body that is non-removably disposed within the chamber of the bulbous portion of the elongated tube, the dispensing member comprising an oral care agent that is configured to be released from the rigid body as a fluid flows through the internal fluid passageway.

13. The oral irrigator according to claim 12 wherein the dispensing member and the bulbous portion of the elongated tube have a size and shape that prevents removal of the rigid body from the chamber without breaking the elongated tube.

14. The oral irrigator according to claim 12 wherein an inner surface of the bulbous portion of the elongated tube is contoured to wrap at least partially around the dispensing member to maintain the rigid body of the dispensing member in a fixed position within the chamber.

15. The oral irrigator according to claim 12 wherein the dispensing member is in a shape of a torus having a central opening that is aligned with the internal fluid passageway.

16. The oral irrigator according to claim 12 wherein a visible characteristic of the dispensing member changes as the oral care agent is dispensed from the dispensing member over many uses to provide a visual indicator to a user that the oral irrigator tip should be replaced.

17. The oral irrigator tip according to claim 16 wherein the dispensing member comprises a non-dissolvable portion having a first visible characteristic and the oral care agent having a second visible characteristic, the oral care agent covering at least a portion of the non-dissolvable portion so that prior to first use the second visible characteristic is visible through the elongated tube, and wherein as the oral care agent is released, the non-dissolvable portion of the dispensing member becomes exposed so that the first visible characteristic becomes visible through the elongated tube.

18. The oral irrigator tip according to claim 12 wherein the bulbous portion of the elongated tube comprises:

an annular ledge portion upon which a lower surface of the dispensing member is positioned, the annular ledge portion being oriented perpendicular relative to a longitudinal axis of the internal fluid passageway;

a convex portion that wraps around at least a portion of an outer peripheral surface of the dispensing member; and a concave portion that extends from the convex portion towards the second end of the elongated tube.

* * * * *